June 20, 1961 J. P. LE BEL 2,989,269
CONVERTIBLE AIRCRAFT
Filed April 6, 1959 4 Sheets-Sheet 1

INVENTOR.
JOHN P. LeBEL
BY *Fulwider Mattingly & Huntley*
Attorneys

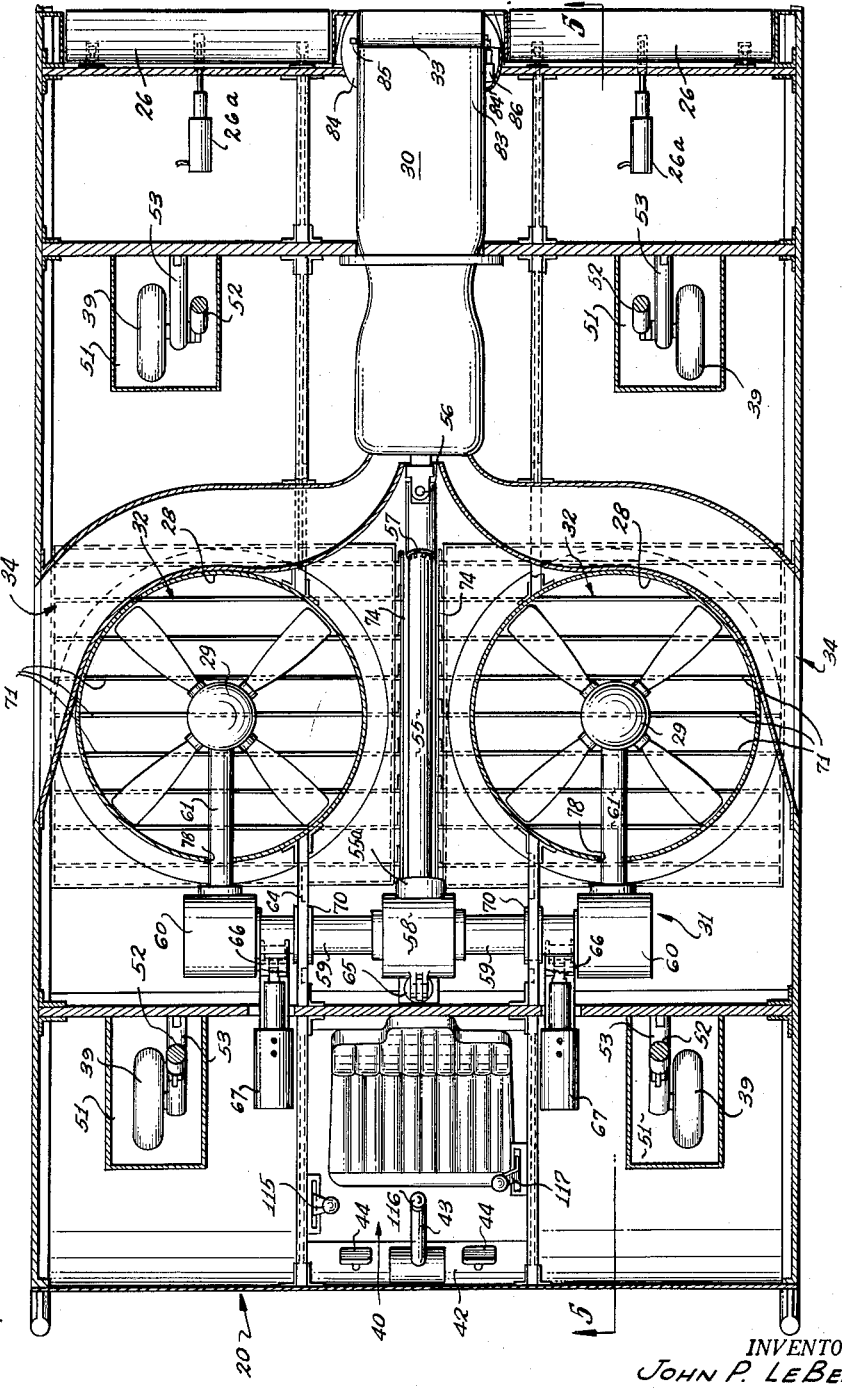

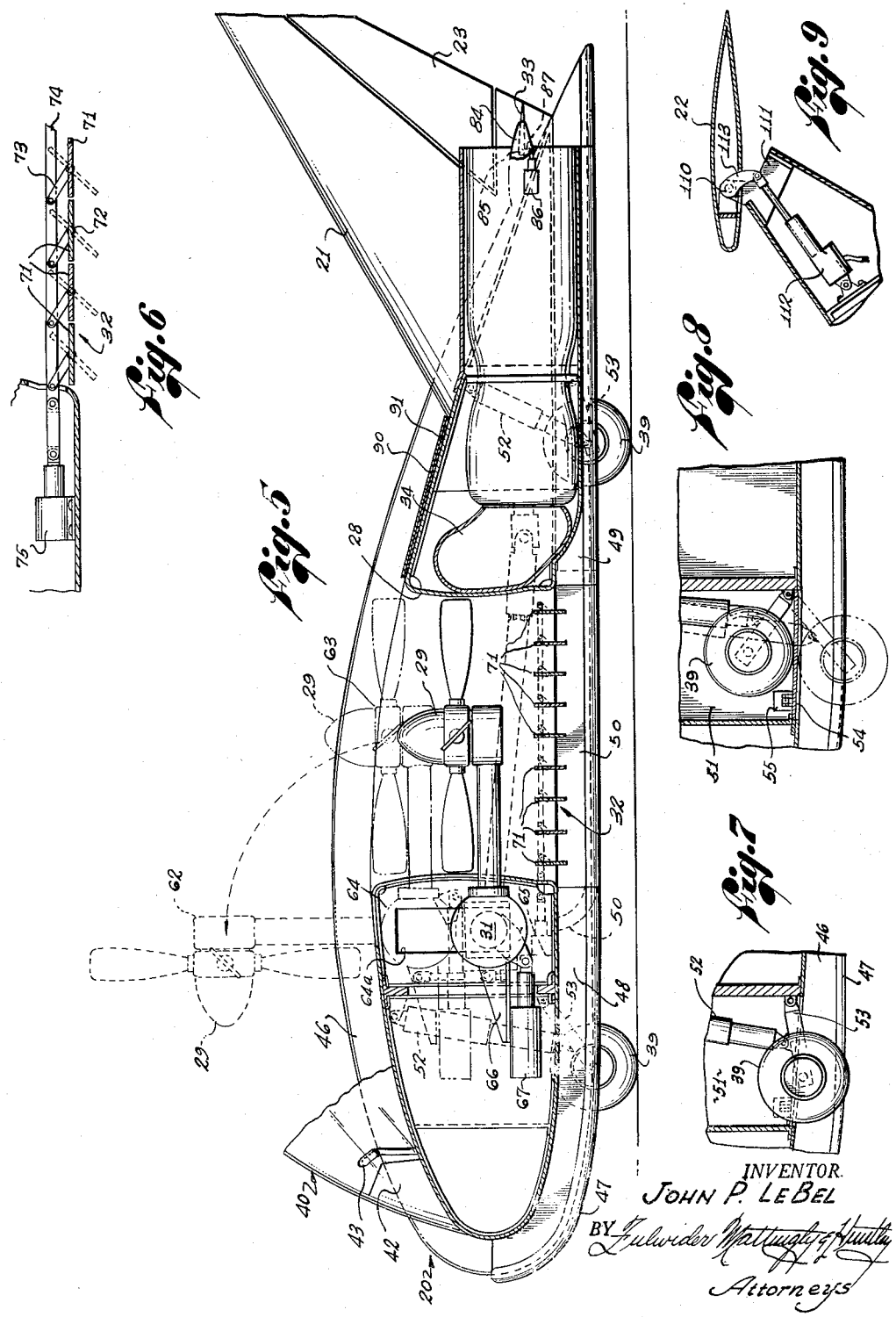

June 20, 1961  J. P. LE BEL  2,989,269
CONVERTIBLE AIRCRAFT
Filed April 6, 1959  4 Sheets-Sheet 4

INVENTOR.
JOHN P. LE BEL
BY Fulwider Mattingly & Huntley
Attorneys

United States Patent Office 2,989,269
Patented June 20, 1961

2,989,269
CONVERTIBLE AIRCRAFT
John P. Le Bel, Los Angeles, Calif.
(1948 E. 5th St., Mesa, Ariz.)
Filed Apr. 6, 1959, Ser. No. 804,425
19 Claims. (Cl. 244—12)

The present invention relates generally to aircraft, and more particularly to a convertible aircraft of the type capable of vertical take-off and landing, as well as forward flight.

An object of my invention is to provide a vertical take-off and landing aircraft which combines the propulsion advantages of a fixed-wing aircraft and the sustension and hovering advantages of rotary-wing aircraft.

Another object of the invention is to provide a convertible aircraft of this type which is also operable on bodies of water, on snow and ice, on highways in the manner of a vehicle, or over rugged terrain and swampland. In part, this is achieved by a novel flying-wing configuration that incorporates the payload space, as well as the sustension and propulsion means of the aircraft, within an airfoil that is adapted to serve as the hull of an amphibious craft, or as the chassis of a land-traveling vehicle. With this arrangement my aircraft is enabled to move about in environments other than the atmosphere without regard to the presence or absence of prepared ground support facilities, and thus is well adapted to provide access to otherwise inaccessible geographical areas.

A further object of my invention is to provide a convertible aircraft of the flying-wing type, the wing being adapted for hovering flight by the inclusion of ducted-fan sustension means therein.

It is also an object of my invention to provide a convertible aircraft of the flying-wing type just mentioned in which selectively controllable louver means are associated with the ducted-fan means for reactively propelling the aircraft.

The invention also has for an object the provision of a ducted-fan, flying-wing convertible aircraft in which the propeller means of the ducted fan is shiftable to dispose the thrust axis thereof horizontally, whereby the propeller means can be selectively utilized as sustension or propulsion means for the aircraft.

It is also an object of the invention to provide a ducted-fan, flying-wing aircraft with aerodynamic characteristics enabling selective utilization of the propeller means in sustension and propulsion positions.

A still further object of the invention is to provide a convertible aircraft of the fixed-wing type in which a single power means, or prime mover, is provided both for sustaining and propelling the aircraft.

Yet another object of the invention is to provide a convertible aircraft which can be safely returned to earth from low altitudes in the event of a power failure.

It is also an object of the invention to provide a convertible aircraft that is readily and easily maneuverable in both propelled flight and sustained hovering, and that in both forward and hovering phases of flight is largely controllable by orthodox aircraft controls whereby pilot training or transition is readily accomplished.

These and other objects and advantages of my invention will be apparent from the following description of a presently preferred embodiment thereof, when taken in conjunction with the annexed drawings in which:

FIGURE 4 is a horizontal sectional view taken substantially within the plane of the chord of the fixed-wing fuselage of the aircraft, on the line 4—4 of FIGURE 1;

FIGURE 5 is a vertical sectional view taken on the line 5—5 of FIGURE 4, and illustrating, in phantom outline, stages in the movement of the propeller means from a vertical to a horizontal thrust axis;

FIGURE 6 is a fragmentary vertical sectional view of one set of louvers and a control means therefor;

FIGURE 7 is a fragmentary vertical sectional view of a landing wheel well of the aircraft, showing the wheel in a semi-retracted position for utilization over snow or the like;

FIGURE 8 is a view similar to FIGURE 7, but showing a landing wheel in fully retracted position and illustrating in phantom outline the extended position of the wheel;

FIGURE 9 is a fragmentary vertical sectional view illustrating interior details of construction of the connection of the horizontal stabilizer to one of the vertical stabilizers of the aircraft;

Figure 1:
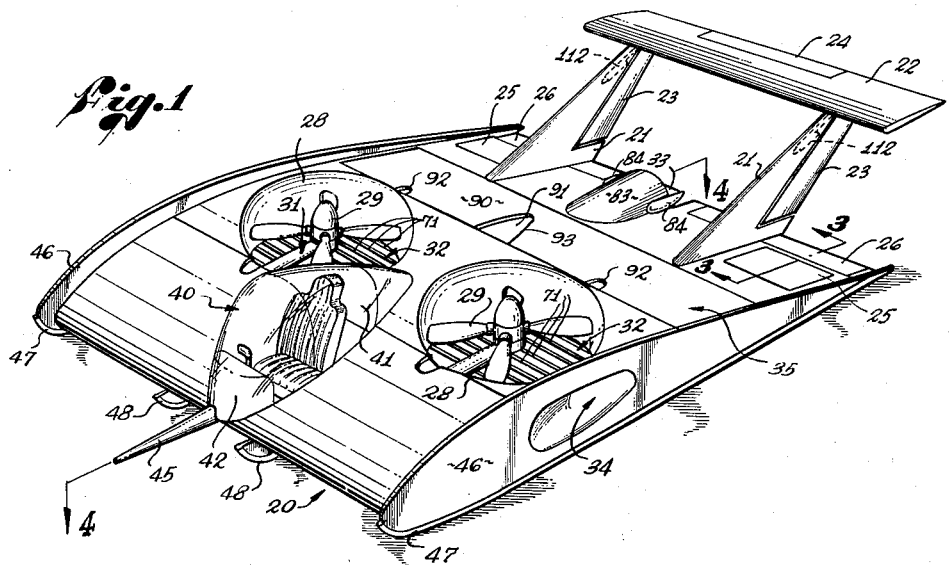
FIGURE 1 is a three-quarter front perspective view of an aircraft embodying my invention.
Figure 2:
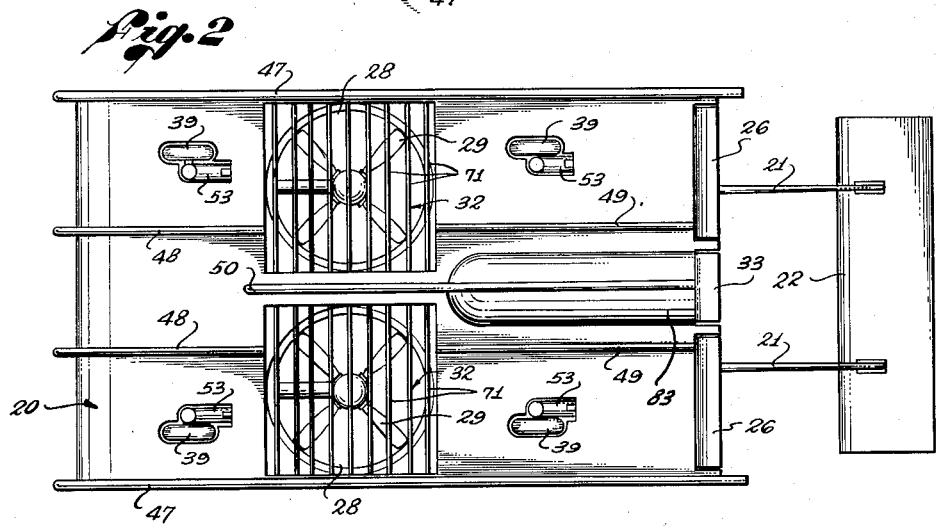
FIGURE 2 is a bottom plan view.
Figure 3:
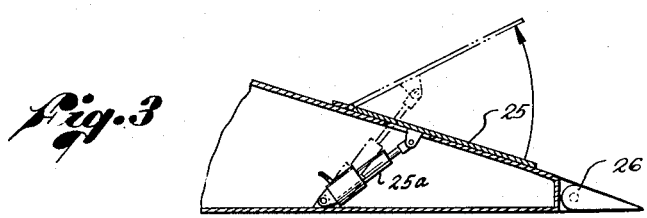
FIGURE 3 is a fragmentary sectional view taken on the line 3—3 of FIGURE 1.

In the drawings, my invention is illustrated as embodied in a relatively small aircraft adapted for the transport of a single person, as, for example, a reconnaissance aircraft. It will be understood that the invention is not limited to an aircraft of this size or for this purpose inasmuch as the principles involved lend themselves to aircraft of greater or of lesser size and usable for other purposes. However, for purposes of illustration a reconnaissance aircraft is well adapted to illustrate the versatility of my design and its adaptability to operations on bodies of water, rugged terrain, or over highways.

In general, and referring in particular to FIGURE 1, the aircraft broadly comprises a fuselage 20 of low-aspect airfoil configuration having a pair of swept-back vertical stabilizers 21 mounted in upstanding position on its trailing edge that, in turn, support an adjustable horizontal tailplane or stabilizer 22. In propelled flight, directional yaw control is achieved through rudders 23 incorporated in the vertical stabilizers 21, and pitch control is achieved through manipulation of the horizontal tailplane 22, the latter incorporating a trim tab 24. In lieu of ailerons, a pair of lateral-control drag flaps or spoilers 25 are mounted on the upper surface of the fuselage 20 outwardly adjacent the vertical stabilizers 21 and spaced forwardly from the trailing edge of the fuselage. A pair of wing flaps 26 are mounted immediately behind the spoilers 25 and comprise trailing-edge portions of the fuselage 20.

The fuselage 20 is formed with a pair of ducts 28 extending vertically therethrough that are disposed on opposite sides of the longitudinal centerline of the aircraft, spaced relatively forwardly on the fuselage 20 and flanking the center of gravity of the aircraft when in condition for sustension, as in FIGURE 1. A pair of propellers 29, adapted for counter-rotation, are adapted to be selectively concurrently positioned within the ducts 28, and are driven by a turbojet engine 30 through a drive-train assembly 31. The engine 30 is positioned on the mean longitudinal centerline of the aircraft and a pair of air-intake conduits 34 extend inwardly from opposite sides of the aircraft for conducting air to the engine 30.

A set of louvers 32 is mounted across the lower end of each of the ducts 28 that can be inclined at will to cause controlled vertical and horizontal movement of the aircraft. Roll control about the longitudinal axis is achieved during sustension by selective operation of the louvers beneath either the left or right duct 28. During this phase of flight, pitch control is achieved by means of a pitch control 33 mounted in horizontally extending position across the tailpipe of the engine 30. In transition from hovering to propelled flight, the louvers 33 are gradually inclined forwardly to reactively drive the aircraft forwardly until such time as the airfoil configuration of the fuselage 20 provides sufficient lift for the weight of the aircraft. The propellers 29 are mounted on a portion of the drive train 31 for selective movement upwardly out of the ducts 28 and then pivotally forwardly to align their thrust axes with the longitudinal axis of the fuselage 20. The aircraft is then rapidly further accelerated into horizontally propelled flight by the propellers 29. The louvers 32 are then actuated to a fully closed position and the upper ends of the ducts 28 then closed by a means 35 which thereafter comprise lift-producing portions of the upper surface of the fuselage airfoil during propelled horizontal flight.

More particularly, the airframe of the aircraft as a whole is constructed according to conventional aircraft practices and, accordingly, the structural details of the fuselage and tailplane assembly, and the several control surfaces thereof, will not be described in detail. Suffice it to say that in the illustrated embodiment the fuselage 20 comprises a substantially rectangular section of a relatively high-camber airfoil. A cockpit enclosure 40 is provided at the leading edge of the fuselage 20 along the longitudinal axis of the aircraft, the enclosure including a movable canopy 41. Within the enclosure 40 is an instrument pedestal 42, a swivelly mounted control stick 43, and rudder pedals 44 mounted for conventional opposite movement. A Pitot-static tube enclosure 45 is affixed to the leading edge of the fuselage 20 and extends forwardly therefrom along the longitudinal axis of the aircraft. It will be observed that the tube enclosure 45 is elongated and of vertically elongated cross-sectional configuration to serve as an aid to the pilot in controlling the attitude of the aircraft relative to the horizon under visual flight conditions.

In the illustrated embodiment of my invention the airfoil fuselage 20 has a very low aspect ratio, on the order of 0.5. It will be appreciated that with such a low ratio it is desirable to channel the airstream over the upper and lower surfaces of the airfoil in such a manner as to prevent the spilling and exchange of air vertically around the opposite ends of the airfoil. For this purpose a pair of fences 46 are mounted on the opposite ends of the fuselage 20, these fences being geometrically similar to the airfoil profile of the fuselage 20 but larger scale and with their chord lines disposed in the chord plane of the fuselage. The profiles of the fences 46 may be altered where necessary to achieve a desired keel effect for proper stability.

A protective bumper and skid strip 47 is affixed to each fence 46 and extends from the leading edge of the fence downwardly and along the length of the underside of each fence. The strips 47 serve as protective bumpers when the aircraft is traversing rough terrain, and are also adapted for utilization as skids on snow and ice. For the same purpose, a pair of front bumper and strip assemblies 48 are affixed to the underside of the fuselage 20, spaced on opposite sides of the longitudinal axis and in alignment with a pair of rear bumper and strip assemblies 49 comprising continuations of the front strips rearwardly of the ducts 28. In between the ducts 28 another bumper and strip assembly 50 is affixed to the underside of the fuselage 20 along the longitudinal centerline of the aircraft. The lower edges of all of these assemblies are positioned within a common plane (see FIGURE 1).

The aircraft is normally supported on the ground by a plurality of landing wheels 39. In the present embodiment I have illustrated four such wheels, but it will be apparent that a tricycle arrangement can be employed. The four wheels 39 are arranged in two pairs, each wheel preferably being castered, and one or both pairs of wheels being steerable by a means (not shown) through actuation of the rudder pedals 44.

To permit retraction of the wheels 39, the fuselage 20 incorporates a wheel well 51 for each wheel. For extending and retracting the wheels, each wheel well includes a wheel-retracting means 52 connected at one end to a wall portion of the wheel well 51. The other end of the means 52 is connected to a wheel-support arm 53, which in turn is pivotally mounted at one end to a wall portion of the well 51.

It will be understood that all of the retracting means 52 simultaneously operate in response to a suitable control located in the cockpit enclosure 40. These wheel control means are preferably adapted to permit selective positioning of the wheels in fully extended and retracted positions as shown in FIGURE 8, or in an intermediate position such as is shown in FIGURE 7. In flight, the wheels 39 are moved to the fully retracted position shown in solid outline in FIGURE 8, while for landing the wheels are lowered to the fully extended position shown in phantom outline. In order to cover the openings of the wheel wells 51 when the wheels are fully retracted, each wheel well slidably incorporates a door 54 controllable by an actuator 55 (see FIGURE 8). The wheel-well doors 54 and the control means therefor are operatively associated with the control means for raising and lowering of the wheels 39 in a conventional manner so as to be automatically opened and closed in the proper timed relationship to movement of the wheels.

The fuselage 20 is of fluid-tight construction and adapted to be buoyantly supported when the aircraft comes to rest on a body of water. For amphibious operations the wheels 39 are retracted and the wheel-well doors 54 closed, the doors 54 also being adapted to provide a fluid-tight closure for the wheel wells 51.

When the aircraft is to be operated over rough terrain, the wheels 39 are locked in the intermediate position illustrated in FIGURE 7. It will be observed that in this position the wheels 39 extend lower than the plane of the skid runners 48, 47, 49, and 50. With this arrangement, when the aircraft is moving in the manner of a vehicle over relatively smooth terrain, it is supported by the wheels 39. However, in the event of unevenness in the supporting ground, the elongated skid runners, or group of skid runners, will tend to lift the underside of the fuselage 20 clear of any obstructions encountered, thereby avoiding any puncturing of the fuselage skin.

Referring now to FIGURE 4, it will be seen that the drive-train assembly 31 is generally E-shaped in configuration. The central arm of the E comprises a torque tube 55 connected at one end to the output shaft of the prop-jet engine 30 through a universal joint coupling means 56. To maintain the driving connection of the assembly 31 and engine 30 throughout all differently elevated positions of the assembly 31, the torque tube 55 and coupler 56 have a spline connection, indicated generally in 57.

The other end of the torque tube 55 has a bearing 55a that is slidable in a gear housing 58 and is differentially drivingly engaged with a pair of transfer drive shafts (not shown) that are disposed in coaxial alignment with one another and normally relative to the torque tube 55. These transfer drive shafts extend coaxially within a pair of tubular housings 59 extending outwardly from opposite ends of the differential gear housing 58. The inner ends of the housings 59 are rigidly affixed to the differential gear housing 58, while their outer ends rotatably mount transfer gear housings 60. Another tubular housing 61 is rigidly fastened at one end to each of the transfer gear housings 60 and extends rearwardly therefrom in a plane parallel to a vertical plane including the torque tube 55 to rotatably support a propeller assembly 29 coaxially within one of the ducts 28. Each of the housings 61 provides bearing support for a propeller drive shaft (not shown) which has a gear connection with an end of the drive shaft disposed within the housing 59. The gear connections between the torque tube 55 and through the two trains of drive shafts to the pair of propellers 29 are adapted to achieve counter-rotation of the pair of propellers.

It will be appreciated that in order to utilize the ducted-fan principle for supporting the aircraft the ducts 28 must be of appreciable vertical length without any extreme Venturi curvature. Accordingly, when it is desired to move the propellers 29 out of the ducts 28 into the fully raised phantom-outline position 62 indicated in FIGURE 5, a means must be provided to first raise the drive-train assembly and propellers 29 vertically to an intermediate position 63, before pivoting the propellers into the position 62, so that the propellers will not come into contact with the walls of the ducts 28. To accomplish this, I have provided a propeller-moving means best shown in FIGURES 4 and 5.

Vertical movement or adjustment of the drive-train assembly 31 is preferably accomplished by means of an electric screw jack actuator 65 that is rigidly fastened at its lower end to a reinforced section of the bottom skin of the fuselage 20 immediately behind the main spar of the fuselage and on the longitudinal centerline of the aircraft. The vertically extending actuator 65 at its upper end is drivingly connected to the transfer gear housing 58, whereby extension and retraction of the screw effects a corresponding raising and lowering, respectively, of the drive-train assembly 31.

Figure 10:
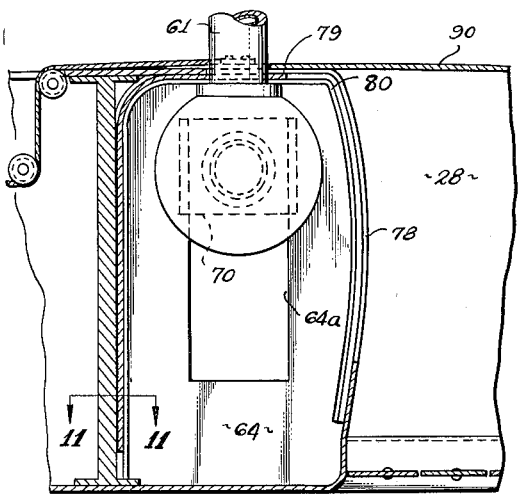
FIGURE 10 is a fragmentary vertical sectional view showing interior details of construction of a wall portion of the fan or propeller duct.
Figure 11:
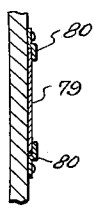
FIGURE 11 is a fragmentary sectional view taken on the line 11—11 of FIGURE 10.

Due to the presence of the universal coupler 56 and spline connection 57, the torque tube 55 is moved vertically only at its slidable bearing connection 55a with the transfer gear housing 58. The housings 61, however, must be maintained in substantially horizontal positions (i.e., within planes normal to the axis of the ducts 28) so as to prevent the propeller tips from coming into engagement with the duct walls. Referring to FIGURE 10 it will be seen that each housing 59 extends through a reinforced wall 64 having a vertically extending slot 64a formed therein to accommodate vertical movement of the housing. Rigidly affixed to each housing 59 is a surrounding shoe 70 of inner-circular configuration that has opposite sides slidably engaged in tongue and groove relationship to the opposite vertically extending sides of the corresponding slats 64a to hold the housing against any angular movement.

For pivoting the propellers 29 and housing 61 to the position 62 of FIGURE 5, each of the tubular housings 59 immediately inwardly of the transfer gear housings 60 has a forwardly extending arm 66 affixed thereto which mounts an actuator 67. Each of the actuators 67 has a screw rod which is pivotally connected to a generally downwardly extending arm 68, rigidly connected to the rotatable housing 60. After the drive-train assembly 31 has been elevated to the phantom-line position 63 of FIGURE 5, the pair of actuators 67 are actuated in unison to cause pivotal movement of the gear housing 60, housing 61, and propellers 29 to the phantom-outline position 62 of FIGURE 5, whereby the thrust axes of the propellers are aligned with the line of flight of the aircraft.

Referring now to FIGURE 5, it will be seen that the ducts 28 are venturi-like in configuration, with the upper ends thereof being faired into the upper skin of the fuselage 20. With this arrangement suitable clearance is provided between the tips of the propeller 29 and the walls of the ducts 28 and the upper skin of the fuselage 20, so as to avoid any danger of contact between the propeller tips and the surfaces of the aircraft structure.

Each set of parallel louvers 32 is mounted across the bottom end of a duct 28 in a direction normal to the line of flight. Each set of louvers comprises a plurality of individual elongated rectangular slat members 71, each of which is affixed to a pivot rod 72 that is pivotally mounted at its opposite ends in confronting wall surfaces of the fuselage 20. Each of the rods 72 is drivingly engaged to one end of a link arm 73, and the other end of each link arm is pivotally connected to a control rod 74 extending longitudinally of the aircraft. One end of each control rod 74 is drivingly connected to one of a pair of actuators 75, which in turn are remotely controllable, alternately or concurrently, from the cockpit enclosure 40.

Each set of louvers 32 is individually controllable through one of the actuators 75, all of the slats 71 of each set of louvers being adapted for co-movement. Each set of louvers is adapted for movement throughout an arc of more than 90 degrees, so that the slats 71 can be moved from the fully closed positions indicated in FIGURE 6 in a clockwise direction to the phantom-outline positions of FIGURE 6. To achieve vertical take-off and descent of the aircraft, both sets of louvers 31 are moved together to these phantom-outline positions of FIGURE 6. The column of air flowing downwardly from the propellers 29 is thus directed towards the front of the aircraft to produce a reactive force tending to move the aircraft rearwardly for the purpose of offsetting the jet thrust emanating from the jet-prop engine 30, so that perfectly vertical movement can be achieved, as well as hovering.

In order to secure maximum efficiency of the action of the propellers 29 when positioned within the ducts 28, it is desirable to provide an unbroken, continuous wall surface for the ducts. At the same time, the propeller supporting structure, particularly the housings 61, must extend through a wall portion of the ducts in order to achieve the desired movability of the propellers 29. A means for accomplishing this, while maintaining continuous duct walls, is shown in FIGURE 10.

An aperture 78 is formed in the wall of each duct 28 to accommodate vertical movement of one of the housings 61, which aperture opens into the upper skin of the fuselage 20. For closing this aperture when the propellers are positioned within the ducts 28, each arm 61 drivingly mounts one end of a flexible metal closure strip 79, the strip 79 in turn being guidedly restrained within a pair of opposed tracks 80 that are fastened alongside opposite edges of the aperture 78 and therebeyond within the fuselage 20. With this arrangement the closure strip 79 is driven by movement of a member 61 into open and closed positions corresponding to raised and lowered positions, correspondingly, of the arm 61 and the propeller 29 thereon.

The prop-jet engine 30 is positioned within an engine housing 83 that is faired into the upper and lower skins of the fuselage 20. For mounting the hovering pitch-control flap 33 in diametrically extending horizontal position at the end of the exhaust tube of the engine 30, a pair of hinge supports 84 are faired into diametrically opposite sides of the engine housing 83, to which the pitch-control flap 33 is pivotally interconnected, as indicated at 85 (see Figure 4). A small actuator 86 is mounted within one of the pivot housings 84 and drivingly interconnected to a crank arm 87 adapted for turning the pivot pin 85. The actuator 86 is adapted to respond to movement of the control stick 43 in unison and in co-movement with actuation of the horizontal stabilizer 22. The pitch-control flap 33 thus cooperates with the horizontal stabilizer 22 during forward flight of the aircraft. During hovering flight, when the horizontal stabilizer and other control surfaces are partly ineffective, the exhaust from the engine 30 acts on the pitch-control flap 33 for regulating pitching movement of the aircraft while hovering.

Figure 12:
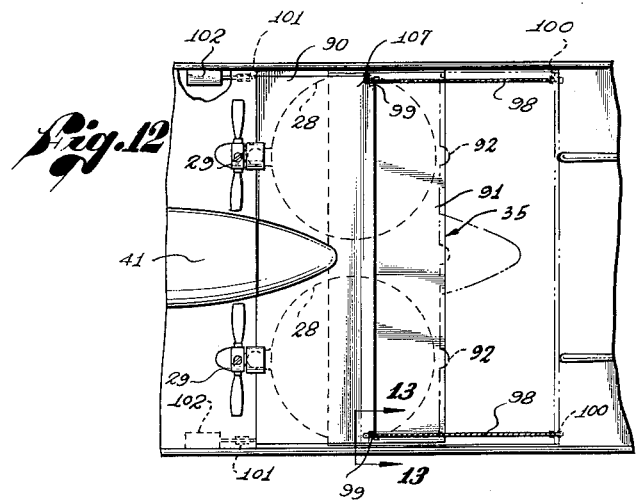
FIGURE 12 is a partial top plan view of the aircraft, showing the propellers in propulsion position and the propeller ducts closed.
Figure 13:
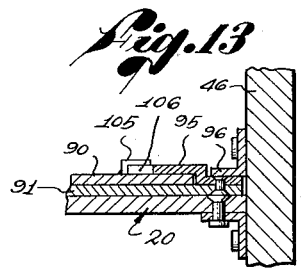
FIGURE 13 is a fragmentary sectional view taken on the line 13—13 of FIGURE 12.
Figure 14:
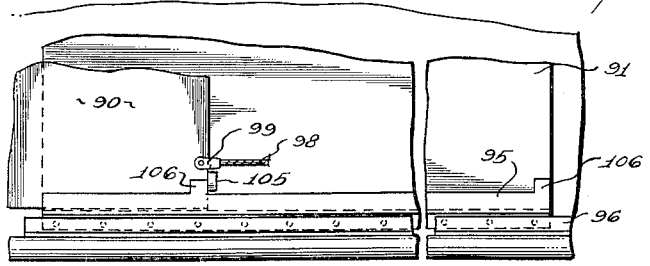
FIGURE 14 is a fragmentary top plan view taken along one side of the aircraft to illustrate details of construction of the duct-closing members.

The means 35 for closing the pair of ducts 28 after the propellers 29 have been raised are best seen in FIGURES 12 through 14. This means comprises an upper member 90 slidably overlapping a lower member 91, both of which are of generally rectangular configuration. The upper member 90, however, is formed in its front edge with a pair of apertures 92 on opposite sides of an enlarged central aperture 93. Upon actuation of the means 35 the upper member 90 is pulled forwardly after the propeller 29 has been raised, and the aperture 93 is adapted to matingly seat the trailing edge of the cockpit enclosure canopy 41, while the pair of apertures 92 are adapted for mating reception or seating against the vertical shafts or housings 61.

The lower member 91 is directly slidably supported on the upper skin of the fuselage 20, and the upper member 90 is in turn slidably supported on top of the lower member 91. Referring to FIGURE 13, it will be observed that the upper member 90 is slightly shorter than the lower member 91 and each end of the upper member 90 is slidably received beneath one of a pair of overhanging guide members 95 affixed to opposite ends of the lower member 91 and extending longitudinally of the aircraft. The outer edge portions of the guides 95 and lower member 91, in turn, are slidable received beneath one of a pair of L-shaped guide members 96 that are fastened along the insides of the fences 46.

In order to actuate the closing means 35, a pair of cables 98 are interconnected to opposite ends of the upper member 90 in the manner indicated in FIGURE 12. Each cable 98 is connected at one end 99 to one end of the rear or trailing edge of the upper member 90, extending rearwardly therefrom to be turned over a pulley 100. The other end 101 of each cable 98 is connected to an end of the front or leading-edge portion of the upper member 90 to extend forwardly into a remotely controllable motor-driven drive sheave assembly 102, thence extending rearwardly to the pulley 100. The pair of drive assemblies 102 are adapted for operation in unison and are reversible so that the upper member 90 is moved forwardly or rearwardly in response to selective actuation of the drive assemblies 102.

A lost-motion means interconnects the upper member 90 and lower member 91, and in the present instance takes the form illustrated in FIGURE 14. The trailing edge of the upper member 90, at its opposite ends, has rigidly affixed thereto a pair of drive lugs 105. As is shown in FIGURE 13, the lugs 105 project upwardly above the upper surface of the upper member 90 and are positioned immediately inwardly of the guides 95 of the lower member 91. Each guide 95 is in turn formed with a pair of inwardly projecting tabs 106, one of which is positioned at the trailing edge of the lower member 91 and the other of which is positioned an appreciable distance rearwardly of the leading or front edge of the lower member 91. The drive lugs 105, and therefore the upper member 90, are movable independently of movement of the lower member 91 for a distance corresponding to the spacing between the pair of tabs 106. When the drive lugs 105 engage one or the other of the tabs 106, both members 90 and 91 are thereafter moved concurrently in response to actuation of cables 98.

In FIGURES 1 and 5 the ducts 28 are open at their upper ends, the upper member 90 being superimposed on the lower member 91 immediately rearwardly of the ducts. After the propellers 29 have been raised out of the ducts 28, the ducts are closed by actuating the drive assemblies 102 for pulling on the ends 101 of the cables 98; the upper member 90 is then pulled forwardly independently of the lower member 91 until the drive lugs 105 engage the foremost tabs 106. Both members 90 and 91 are thereafter moved forwardly in unison until coming to rest in the positions shown in FIGURE 12, wherein the upper ends of the ducts 28 are closed. It will be observed that the members 90 and 91 overlap appreciably, as indicated by the area 107, so that the opposite ends of the upper member 90 are at all times retained under the guides 95. The members 96 extend from the vertical stabilizers 21 forwardly beyond the midpoints of the ducts 28, and preferably to points in alignment with the foremost ends of the ducts 28. At their foremost ends, the overhanging flange portions of the guides 95 are spaced apart from the upper skin of the fuselage 20 a distance corresponding to the thickness of the upper member 90, to prevent the member 90 being lifted away from the fuselage. It will be appreciated that when the ducts 28 are closed in this fashion the upper skin of the airfoil configuration of the fuselage 20 is complete and its efficiency as an airfoil is greatly increased.

To retract the closure means 35, the drive assemblies 102 are simultaneously actuated in the opposite direction; the upper member 90 is thereby first pulled rearwardly independently of the lower member 91 until such time as its drive lugs 105 engage the rearmost tabs 106. The pair of members 90 and 91 are thereafter concurrently retracted to the positions of FIGURE 1, whereby the ducts 28 are once again opened at their upper ends.

It will be appreciated that the center of pressure of the airfoil fuselage 20 and the center of gravity of the aircraft will be changed by closing of the ducts 28 with the means 35 and by raising the propellers 29. Accordingly, it is desirable to provide a stabilizing means for counteracting these changes, and for this purpose I provided a mounting of the horizontal tailplane 22 and configuration thereof as shown in FIGURE 9.

The horizontal tailplane 22 combines the functions of a fixed horizontal stabilizer and elevator. The tailplane 22 in cross section has a double-cambered profile and is pivotally connected by a hinge 110 to a pair of brackets 111, each of these brackets being rigidly affixed in the upper end of one of the vertical stabilizers 21. The hinge 110 is positioned relatively forwardly on the airfoil profile so that the air loads ahead of and behind the hinge line tend to dynamically balance one another. An electrical actuator 112 is also mounted within the upper end of each of the vertical stabilizers 21 and is drivingly connected to an actuator arm 113, which in turn is drivingly engaged with the hinge 110. It will be understood that the actuator 112 is operatively associated in the conventional manner with the control stick 43 so that the attitude of the horizontal stabilizer 22 relative to the airstream or direction of flight is controllable in a conventional manner.

By use of the trim tab 24, the horizontal tailplane 22 can be set at appropriate angles of attack suitable for the particular condition of flight. After the horizontal tailplane 22 has been properly trimmed, it responds in the manner of an elevator to actuation of the control stick 43. It will be apparent that different conditions of trim are required for dead-stick landings or gliding flight, the open-duct condition illustrated in FIGURE 1, and the condition illustrated in FIGURE 12 wherein the ducts 28 are closed. With this tailplane arrangement a proper balance of longitudinal moments is achieved for the varying conditions of flight, and in particular the proper balance of longitudinal moments is achieved to compensate for shifting in the center of pressure and center of gravity of the aircraft resulting from movement of the propellers 29 between raised and lowered positions.

Where airport facilities are available, the aircraft of my invention can take off and land in the usual manner, after the ducts 28 have been closed and the propellers 29 arranged with their thrust axes in the horizontal raised position. In taking off and landing, the simple flaps 26 are utilized in the conventional manner, along with the spoilers 25, rudders 23, and the horizontal tailplane 22. It will be understood that when the aircraft is utilized in this conventional manner the sets of louvers 31 are moved to the closed full-line position of FIGURE 6.

For vertical ascent, the pilot actuates a control lever 115 in the cockpit 40 with his right hand, to operate the actuators 75 for co-movement of the louver slats 71 to the phantom-line positions of FIGURE 6. The control 115 is operatively associated with the actuators 75 to simultaneously and concurrently move the slats 71 of each set of louvers at the same rate and in the same direction. Selective movement of either of the sets of louvers 31, independently of the other set of louvers, is accomplished by a rotatable hand-grip 116 at the upper end of the control stick 43 which is operatively associated with both actuators 75. By selective operation of grip 116, one set of louvers 31 can be closed to a different degree than the other set of louvers, according as to whether the hand-grip 116 is rotated to the left or to the right from a lightly spring-loaded neutral position.

The cockpit also includes a conventional throttle control 117. Assuming the propellers to be in the solid-outline positions of FIGURE 5, with the slats 71 of both sets of louvers 31 in the rearwardly inclined phantom-line positions shown, advancement of the throttle control 115 will effect raising of the aircraft. In this connection it will be recalled that the jet thrust of the engine 30 is offset by the rearward inclination of the slats 71 so that perfectly vertical take-off and subsequent hovering can be achieved. In this condition of flight, pitching control is achieved through suitable actuation of the pitch-control flap 33 in response to movements of the control stick 43. At the same time, rolling tendencies are counterbalanced by suitable rotation of the control grip 116 for effecting selective differential closure of the two sets of louvers 31.

After the aircraft has reached the desired altitude, the control 115 is actuated for simultaneously gradually moving the louver slats 71 towards closed positions. As the slats 71 are forwardly inclined, the combination of the jet thrust of the engine 30 and the deflected airstream achieved by the slats 71 accelerates the aircraft forwardly. After an airspeed in excess of stalling speed has been achieved, the drive-train assembly 31 is raised by operation of the lifting actuator 65, followed, preferably automatically, by operation of the pivoting actuators 67. Immediately thereafter the ducts 28 are closed with the means 35 in the manner previously described. The aircraft is then in condition for rapid acceleration to a speed far in excess of that achievable by such devices as rotary-wing aircraft. For vertical descent, the procedure just described is reversed.

While I have disclosed and described herein but a single embodiment of my invention, it will be apparent that various modifications and changes may be made with respect to the foregoing description without departing from the spirit of the invention or the scope of the following claims.

I claim:

1. In an aircraft the combination comprising: a wing; a thrust-producing means that is movable between a vertical thrust axis position within said wing in which it is adapted and arranged for lifting said aircraft and a substantially horizontal thrust axis position outside of said wing in which it is adapted and arranged for propelling said aircraft; and means operatively associated with said thrust-producing means for movement thereof between said axis positions.

2. In an aircraft the combination comprising: a wing; a thrust-producing means that is movable between a vertical thrust axis position in which it is disposed within a duct of said wing to be adapted and arranged for lifting said aircraft and a substantially horizontal thrust axis position in which it is disposed outside of said wing to be adapted and arranged for propelling said aircraft; means on said wing mounting said thrust-producing means for movement thereof between said positions; and a means on said wing that is adapted and arranged for selectively deflecting the exhaust of said thrust-producing means.

3. In an aircraft the combination comprising: a wing formed with at least one duct extending vertically therethrough; a thrust-producing means pivotally mounted on said wing that is movable between a vertical thrust axis position in which it is coaxially positioned within said duct and cooperatively associated with said duct for lifting said aircraft, and a substantially horizontal thrust axis position in which it is positioned outside of said duct and adapted and arranged for propelling said aircraft; means operatively associated with said thrust-producing means for movement thereof between said positions; and a means operatively associated with said duct that is adapted and arranged for selectively deflecting the exhaust of said thrust-producing means to move said aircraft horizontally when said thrust-producing means is positioned within said duct.

4. In an aircraft the combination comprising: a wing formed with at least one duct extending vertically therethrough; a thrust-producing means mounted on said wing for movement between a substantially vertical thrust axis sustension position within said duct and a substantially horizontal thrust axis propulsion outside of said duct, said means in said sustension position being arranged and adapted to lift said aircraft and in said propulsion position being adapted to propel said aircraft to produce a lifting force on said wing; means mounting said thrust-producing means on said wing for movement thereof between said positions; a means mounted across said duct that is adapted and arranged for selectively deflecting the exhaust of said thrust-producing means when in said sustension position; and a means on said wing for closing the upper end of said duct when said thrust-producing means is in propulsion position and adapted to comprise a lift-producing portion of said wing.

5. In an aircraft the combination comprising: a wing formed with a pair of ducts extending vertically therethrough and substantially equally spaced from and on opposite sides of the longitudinal centerline of said aircraft; a thrust-producing means within each of said ducts that are adapted and arranged for lifting said aircraft; a means operatively associated with the lower end of each of said ducts that is adapted and arranged for selectively deflecting the exhaust of said thrust-producing means to propel said aircraft; an actuator for each of said deflecting means; a pilot-controllable means for operating said actuators together for cooperation of said deflecting means; and a pilot-controllable means for differential actuation of said actuators for differential actuation of said deflecting means; and means on said wing mounting said thrust producing means for movement out of said ducts to positions for moving said aircraft forwardly.

6. In an aircraft the combination comprising: a wing formed with at least one duct extending vertically therethrough; an air impeller coaxially mounted within said duct and adapted and arranged to lift said aircraft upon rotation of said impeller; means on said wing supporting said impeller for movement of said impeller out of said duct to a substantially horizontal thrust axis position to move said aircraft forwardly; a turbo-jet engine in said aircraft for rotating said impeller and also adapted for reactively propelling said aircraft though an exhaust tube of said engine; and a pilot-controllable control surface movably mounted behind said exhaust tube and in the exhaust stream of said engine and adapted and arranged to selectively oppose pitching moments of said aircraft.

7. An aircraft as set forth in claim 6 in which a louver means is mounted at the lower end of said duct and adapted for deflecting air oppositely to the direction of said engine exhaust stream to oppose propulsion of said aircraft as a reaction to said engine exhaust stream.

8. In an aircraft the combination comprising: a wing formed with at least one duct extending vertically therethrough; a thrust-producing means mounted on said wing for movement between a vertical thrust axis sustension position within said duct and a horizontal thrust axis propulsion position outside of said duct, said means in said sustension position being arranged and adapted to lift said aircraft and in said propulsion position being adapted to propel said aircraft to produce a lifting force on said wing; means mounting said thrust-producing means on said wing for movement thereof between said positions; and a horizontal stabilizer for said aircraft positioned substantially in alignment with said thrust-producing means when said thrust-producing means is in propulsion position and that is adapted and arranged for movement to positive and negative angles of attack and having a trimming means to dynamically balance said stabilizer in a desired angle of attack, said stabilizer being adapted to dynamically longitudinally balance said aircraft in both sustension and propulsion positions of said thrust-producing means.

9. In an aircraft the combination comprising: a wing formed with a pair of ducts extending vertically therethrough and substantially equally spaced from and on opposite sides of the longitudinal axis of said aircraft; a pair of air-impelling means for said pair of ducts mounted on said wing for movement between a sustension position within said ducts and a propulsion position outside of said ducts, said pair of air-impelling means in said sustension position being substantially vertically arranged and adapted to lift said aircraft and in said propulsion position being substantially horizontally arranged to propel said aircraft to produce a lifting force on said wing; a means mounted on said wing at the lower end of each of said ducts for selectively deflecting air impelled through said ducts by said impelling means to propel said aircraft; an actuator for each of said deflecting means; a pilot-controllable means for operating said actuators for co-movement of said deflecting means; a pilot-controllable means for operating said actuators for differentially moving said deflecting means; a turbo-jet engine in said aircraft for rotating said impellers and also adapted for reactively propelling said aircraft through an exhaust tube of said engine; a substantially horizontally disposed control surface movably mounted behind said exhaust tube in the exhaust stream of said engine and adapted and arranged for selectively opposing pitching moments of said aircraft during hovering, said deflecting means being adapted for deflecting air impelled through said ducts oppositely to the direction of said engine exhaust stream to oppose propulsion of said aircraft in reaction to said engine exhaust stream whereby said aircraft hovers; and a horizontal stabilizer for said aircraft positioned substantially in alignment with said pair of impeller means when said impeller means are in propulsion position and that is adapted and arranged for movement to positive and negative angles of attack and having a trimming means to dynamically balance said stabilizer in a desired angle of attack, said stabilizer being adapted to dynamically longitudinally balance said aircraft during forwardly propelled flight of said aircraft in both sustension and propulsion positions of said impeller means, said stabilizer being adapted for elevator control of said aircraft during forward flight.

10. In an aircraft the combination comprising: a flying-wing fuselage having a low aspect ratio and a pair of ducts extending vertically therethrough disposed on opposite sides of the longitudinal axis of said aircraft; a pair of propellers adapted for coaxial reception in sustension positions within said pair of ducts, said ducts and propellers being adapted and arranged for lifting said aircraft when said propellers are in sustension positions; a set of co-movable louvers extending across the bottom end of each of said ducts substantially normally to the longitudinal axis of said aircraft and adapted for movement to closed position in which each set comprises a continuation of the bottom skin of the airfoil of said fuselage, and for graduated movement to open positions to freely pass or to deflect air impelled through said ducts by said propellers to achieve hovering or propulsion of said aircraft, respectively; a turbo-jet engine in said aircraft drivingly coupled to said propellers and also adapted for reactively propelling said aircraft through an exhaust tube thereof; and a pilot-controllable pitch flap movably mounted behind said exhaust tube in the exhaust stream of said engine and adapted and arranged to selectively oppose pitching moments of said aircraft, said sets of louvers being adapted for deflecting air oppositely to the direction of said engine exhaust stream to oppose propulsion of said aircraft in reaction to said engine exhaust stream whereby said aircraft can hover and means for moving said propellers out of sustension position in said ducts, pivotally upwardly to a propulsion position in which the thrust axes of said propellers are substantially aligned with the longitudinal axis of said aircraft and adapted to propel said aircraft forwardly to produce a lifting force on said flying-wing fuselage.

11. An aircraft as set forth in claim 10 in which said aircraft on the upper skin of the airfoil of said fuselage movably mounts a panel means that is adapted to close the upper ends of said ducts when said propellers are in propulsion position and to thereafter comprise a continuation of the upper skin of the airfoil of said flying-wing fuselage, said panel means being selectively removable from said ducts for movement of said propellers between sustension and propulsion positions when said aircraft is in flight.

12. An aircraft as set forth in claim 10 in which a horizontal stabilizer of said aircraft is positioned substantially in alignment with said propellers when said propellers are in propulsion position and that is adapted and arranged for movement to positive and negative angles of attack and having a trimming means to dynamically balance said stabilizer in a desired angle of attack, said stabilizer being adapted to dynamically longitudinally balance said aircraft during forward flight in both sustension and propulsion positions of said propellers, and said stabilizer being further adapted for elevator action in controlling said aircraft during forward flight.

13. An aircraft as set forth in claim 10 in which said aircraft has a pair of actuators for said two sets of louvers and a pilot-controllable means for operating said actuators in unison for co-movement in unison of said two sets of louvers, said aircraft also having a pilot-controllable means operatively associated with both of said actuators adapted for differentially actuating said actuators for differential actuation of said two sets of louvers.

14. An aircraft as set forth in claim 10 in which said flying-wing fuselage has an aspect ratio of substantially 0.5, the opposite ends of said fuselage mounting a pair of fences of geometrically similar configuration to the airfoil configuration of said fuselage and adapted to channel air between said fences over and under said fuselage.

15. An aircraft as set forth in claim 10 in which said fuselage on the under side thereof is provided with longitudinally extending skid runner means including lower edge portions of said fences.

16. An aircraft as set forth in claim 10 in which said fuselage includes integrally formed water-tight compartments adapted and arranged for buoyantly supporting said aircraft in a body of water.

17. In an aircraft the combination comprising: a wing formed with at least one duct extending vertically therethrough; an air impelling means; means mounted on said wing to support said air impelling means for movement between a sustension position within said duct and a propulsion position outside of said duct, said air impelling means in sustension position having a substantially vertical thrust axis and in propulsion position having a substantially horizontal thrust axis; a turbojet engine in said aircraft drivingly coupled to said air impelling means and also adapted for reactively propelling said aircraft through an exhaust tube of said engine.

18. In an aircraft the combination comprising: a wing formed with at least one duct extending vertically therethrough; a thrust producing means; means on said wing supporting said thrust producing means for movement between a vertical thrust axis position in which said thrust producing means is coaxially positioned within said duct for lifting said aircraft and a substantially horizontal thrust axis position in which said thrust producing means is positioned outside of said duct for propelling said aircraft; and means on said wing for closing the upper and lower ends of said duct when said thrust producing means is in horizontal thrust axis position.

19. In an aircraft the combination comprising: a wing formed with at least one duct extending vertically therethrough, the upper end of said duct being faired into the upper surface of said wing; a support member mounted in said wing to extend through a substantially vertical slot formed in the wall of said duct, the upper end of said slot terminating in the upper surface of said wing; a thrust producing means mounted on an end of said support member, said support member being mounted on said wing for movement of said thrust producing means between a substantially vertical thrust axis position within said duct and a substantially horizontal thrust axis position outside of said duct and above said wing; and a slot-closing means mounted adjacent said duct that is movable into position for closing the area of said slot between said support member and the upper end of said slot when said thrust producing means is within said duct.

References Cited in the file of this patent

UNITED STATES PATENTS

| | | |
|---|---|---|
| 1,783,458 | Windsor | Dec. 2, 1930 |
| 1,951,817 | Blount | Mar. 20, 1934 |
| 2,644,296 | Sanz et al. | July 7, 1953 |
| 2,899,149 | Breguet | Aug. 11, 1959 |

UNITED STATES PATENT OFFICE
CERTIFICATE OF CORRECTION

Patent No. 2,989,269                      June 20, 1961

John P. Le Bel

It is hereby certified that error appears in the above numbered patent requiring correction and that the said Letters Patent should read as corrected below.

Column 9, line 54, after "means" insert -- mounted on said wing --; column 10, line 19, after "propulsion" insert -- position --.

Signed and sealed this 28th day of November 1961.

(SEAL)
Attest:

ERNEST W. SWIDER
Attesting Officer

DAVID L. LADD
Commissioner of Patents
USCOMM-DC